US008306945B2

(12) United States Patent
Morris et al.

(10) Patent No.: US 8,306,945 B2
(45) Date of Patent: Nov. 6, 2012

(54) ASSOCIATING DATABASE LOG RECORDS INTO LOGICAL GROUPS

(75) Inventors: Larry Morris, Wimberley, TX (US); Dale G. Wood, Spring Branch, TX (US)

(73) Assignee: BMC Software, Inc., Houston, TX (US)

( * ) Notice: Subject to any disclaimer, the term of this patent is extended or adjusted under 35 U.S.C. 154(b) by 717 days.

(21) Appl. No.: 11/868,595

(22) Filed: Oct. 8, 2007

(65) Prior Publication Data

US 2009/0094294 A1 Apr. 9, 2009

(51) Int. Cl.
G06F 7/00 (2006.01)
G06F 17/30 (2006.01)
(52) U.S. Cl. .......................... 707/603; 707/737; 707/776
(58) Field of Classification Search .................. 707/682, 707/603, 607, 776, 737
See application file for complete search history.

(56) References Cited

U.S. PATENT DOCUMENTS

| 5,907,848 | A | * | 5/1999 | Zaiken et al. ........................ 1/1 |
| 6,006,234 | A | * | 12/1999 | Govindarajan et al. ............... 1/1 |
| 2002/0116340 | A1 | * | 8/2002 | Hellberg et al. ................. 705/59 |
| 2002/0138475 | A1 | * | 9/2002 | Lee ................................... 707/3 |
| 2003/0055809 | A1 | * | 3/2003 | Bhat ................................. 707/1 |
| 2004/0230623 | A1 | * | 11/2004 | D'Angelo et al. .............. 707/202 |
| 2005/0076006 | A1 | * | 4/2005 | D'Angelo et al. ................. 707/2 |
| 2005/0114508 | A1 | | 5/2005 | DeStefano |
| 2006/0184529 | A1 | | 8/2006 | Berg et al. |
| 2007/0143245 | A1 | * | 6/2007 | Dettinger et al. ................. 707/2 |
| 2008/0071736 | A1 | * | 3/2008 | Smith ............................... 707/3 |

FOREIGN PATENT DOCUMENTS

| EP | 1146426 A2 | 10/2001 |
| WO | 2007059057 A2 | 5/2007 |

OTHER PUBLICATIONS

Alice Rischert, "Oracle@ SQL Interactive Workbook, Second Edition", Dec. 24, 2002, Prentice Hall, 27 selected pages.*
IBM; "IBM IMS Problem Investigator for z/OS: User's Guide," Version 2 Release 1 Second Edition (Sep. 2006); 284 pages.
European Search Report dated May 6, 2010 (08164293.6).

* cited by examiner

Primary Examiner — James E Richardson

(57) ABSTRACT

A method, system and medium for organizing and associating log records into logically related groups is described. One or more input sources from, possibly, different systems/subsystems are input to a log correlation method. As the log records are processed the fields are interrogated to determine which log records are related to each other. As further log records are processed more information about previously unidentifiable relationships is determined. After this later information is known, log records that could previously not be associated with any other log records are added to the existing association. The system engineer is therefore presented with the pertinent information for monitoring, administrating and diagnosing system activities.

24 Claims, 3 Drawing Sheets

ASSOCIATING DATABASE LOG RECORDS INTO LOGICAL GROUPS

BACKGROUND

The invention relates generally to organizing log records generated for computer systems and, more particularly but not by way of limitation, to a method and system for logically associating database and/or system log records.

Database and System log files contain valuable information to diagnose many types of system problems. Application log files also contain valuable information to understand many types of application activities. The primary purpose of these log files is to record information, to track events and to provide information about operations performed on/by the system. The information in log files is generally recorded chronologically and is not organized in a fashion such that one responsible for the monitoring, maintenance and operation of the computer and/or application can readily see the correct granularity of pertinent information at any given time. Log records (that is, individual entries within a log file) may have cryptic contents, with codes and fields that can be identified and found only with expert-level knowledge. In addition, the quantity of records in log files can present a challenge; to diagnose a particular problem the answer might be found in a handful of records among millions of records spread out across multiple separate log files.

SUMMARY

In one embodiment the invention provides a method to associate log records into logical groups in accordance with the following acts: obtaining a plurality of log records (each having multiple fields, each field having a value) from at least one log record input source, associating all of the obtained log records having a first common value in a first field with a first logical group, associating all of the obtained log records having a second common value in a second field with the first logical group, and retaining at least one of the obtained log records whose first field value does not equal the first common value and whose second field value does not equal the second common value. Subsequent processing may associate at least some of the retained log records with a second logical group if the retained log record's second field value equals that identified and associated with said second logical group. It will be recognized by those of ordinary skill in the art that as used here, the first and second field may each comprise more than one log record field. For example, the first common value may be the combined values found in log record fields A, B and C. Similarly, the second common value may be the combined values found in log record fields D and E (or even B, D and E). A computer executable program to implement the method may be stored in any media that is readable and executable by a computer system.

In another embodiment, the invention provides a method to identify and group database log records into logical groups in accordance with the following acts: obtaining a plurality of log records (each having multiple fields, each field having a value) from at least one log record input source, associating a first log record from the obtained log records with a first logical group based on the record's value in a first field, associating a second log record from the obtained log records with the first logical group based on the record's value in a second field, and retaining a third log record if the record's first and second field values do not equal the corresponding field values of the first and second log records. The third log record may subsequently be associated with a second logical group if the record's second field has a value identified as being associated with said second logical group. As noted above, "field values" may comprise the combined values in one or more log record fields.

DETAILED DESCRIPTION

Figure 1:
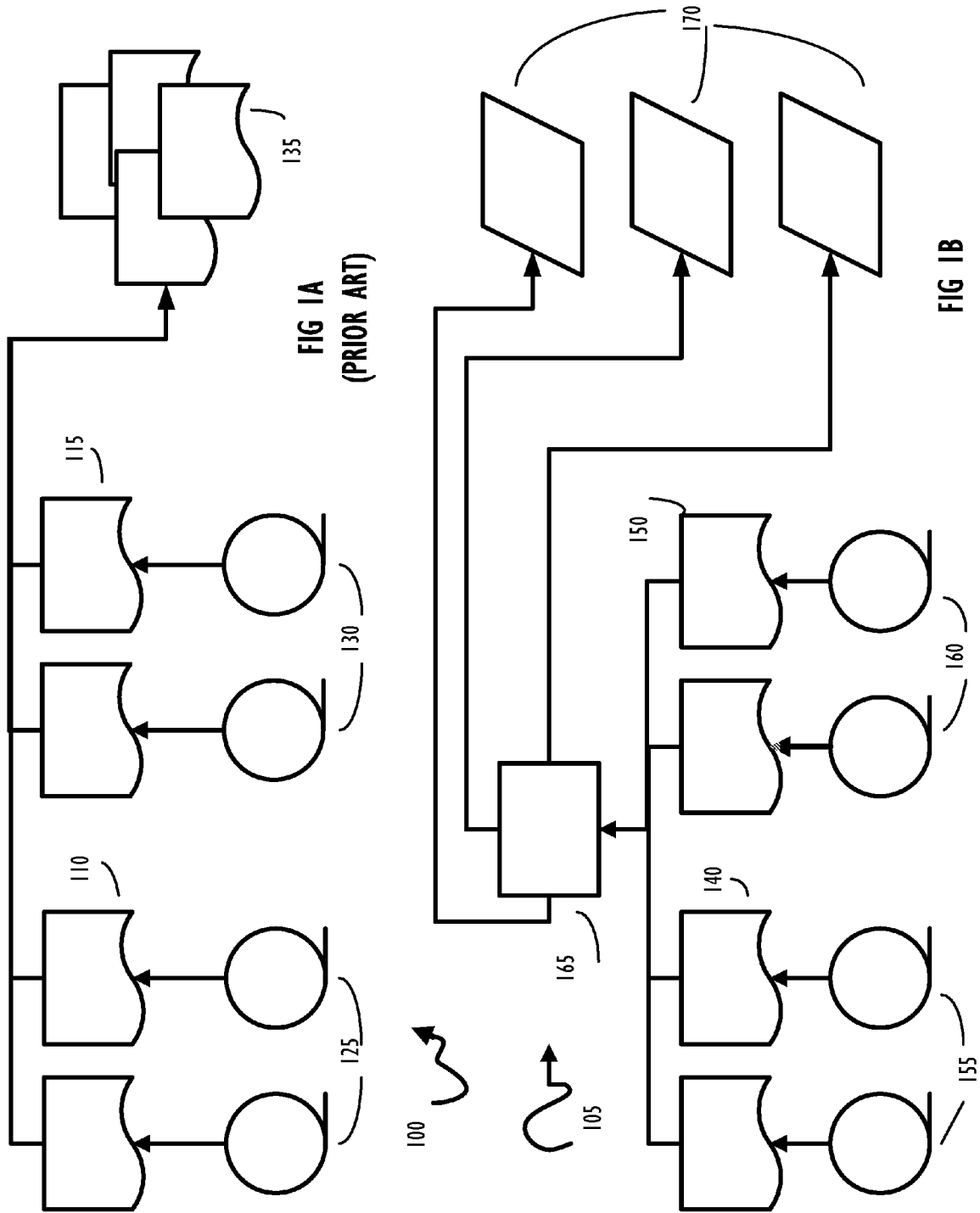
FIG. 1 illustrates the general concept of noise reduction from log files.

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

The instant disclosure describes various embodiments for use in database or systems management environments. By way of example, not intended to limit the scope of the claimed invention, the instant disclosure describes a particular embodiment of a log analyzer for use with an Information Management System (IMS™), a transaction and hierarchical database management system provided by International Business Machines Corporation (IBM). It will be recognized by those of ordinary skill in the art that, given the benefit of this disclosure, the implementation of the disclosed log analyzer technique is appropriate for many other system environments, including but not limited too, relational databases, object oriented databases, process control systems and enterprise management systems. It will also be recognized by those of ordinary skill in the art that the input log records may be stored in and retrieved from various formats, including but not limited too, database tables, binary files, encrypted files or flat files (i.e. plain text).

Definitions to aid in the understanding of this disclosure:

Log File—a file used to automatically record events in a certain scope in order, for example, to provide an audit trail that can be used to diagnose problems and understand system and application activities;

Log Record—a single entry in a log file, typically composed of a fixed number of fields;

Log Record Field—a single, specified portion of a log record maintaining a field value;

Field Value—the actual value in a particular log record field. Of particular importance is the NULL or empty field value. This NULL value indicates that the program or event generating that log record did not supply any information (i.e. a non-NULL value) appropriate for that particular field;

Logical Unit Of Work (LUOW)—a set of related log records that represent all of the actions that were performed to accomplish a particular activity or transaction in the environment to which the log file pertains;

Primary Association Value—a field or combination of fields, in a log record, similar to a primary key in a database. All records having a common, non-NULL, primary association value are said to pertain to a single LUOW;

Secondary Association Value—a field or combination of fields, in a log record, similar to a foreign key in a database. Secondary association values may be used to identify a unique relationship of a log record to a particular LUOW when the log record's primary association value is not ascertainable; and Filter—an attribute test applied to log records in an attempt to decrease the amount of data that requires additional processing. Illustrative filter types include: start/stop log record numbers, start time/stop time relative to log record generation, and include/exclude which are filters that are applied to a particular attribute of the log record (i.e. User ID, Terminal ID, Record type).

FIGS. 1A and 1B illustrate the distinction between correlating log file records manually in accordance with the prior art 100 and using a logical grouping technique 105 in accordance with one embodiment of the invention. Referring to FIG. 1A, in prior art approach 100 sets of log records 110 and 115 from multiple database systems and/or subsystems 125 and 130 are collected to form an uncorrelated set of system log files 135. A user (e.g., system administrator) would then manually sift through the log records in the uncorrelated set of system log files 135 to identify groups of records that are logically or transactionally related to one another. This process is then repeated for each logical grouping or transaction the user wishes to review. It is significant to note that in prior art approach 100, there is no means to juxtapose different identified log record groups to facilitate their comparison or to track trends and the like.

Referring to FIG. 1B, in logical grouping technique 105 sets of log records 140 and 150 are collected from multiple database systems and/or subsystems 155 and 160. Collected log records are then processed to produce organized groups of related log records 165, referred to herein as logical units of work (LUOW). The end user can then review, inspect and process the collected LUOW 170 to facilitate the review and analysis of system-wide or application-wide operational issues.

In one embodiment (e.g. a database environment), three types of LUOWs may be defined: transaction-type LUOW, nontransaction-type LUOW and partial LUOW. A Transaction-type LUOW is generally related to a database transaction and is associated with a beginning time or event and an ending time or event. A single database transaction might involve several queries, each reading and/or writing information within the database. When this transaction is processed, the integrity of the data requires that all steps of the transaction complete successfully or be backed out in their entirety. For example, when performing a money transfer transaction, if the money was debited from one account, it is important that it also be credited to the depositing account. Illustrative transactions also include on-line purchases and booking a trip (which might consist of booking a flight, a rental car and a hotel).

A Nontransaction-type LUOW generally represents events that are not directly related to any given transaction. Transactions of this type include, for example, users signing onto and off-of a system, databases being opened and closed, databases taking extents, system checkpoints being taken, and so on.

A Partial-type LUOW has no identifiable origin, destination, or associated user. A Partial LUOW is often the result of work that a database system performs to move data between systems in a shared-queue environment. A partial LUOW might also result from a transaction whose complete log record sequence was not included in collected log files 140 and 150 or was removed (logically or physically) from collected log files 165 prior to the LUOW being identified.

It will be recognized that different or additional types of LUOWs may be used, depending upon the operational environment. For example, in a systems management environment, event (i.e. all log records that pertain to a monitored system event) and alarm LUOWs (i.e. all log records pertaining to an issued alarm) may be defined. Further, in a process control environment, application and subsystem LUOWs (i.e. all log records generated by a particular application or part of a control process) may be defined.

To limit the amount of processing that must be performed, the end user (e.g., system administrator) may define filters for the log file input sources. One filter type is, start (i.e., SKIP) and stop (i.e., LIMIT) record numbers so that log records at the beginning and end of the log file will be immediately discarded and not interrogated. Similarly, a user may define a start and stop time range in order to confine processing to log records that were generated in a particular time span. Filters also allow the end user to eliminate types of log records from the input stream and thus decrease the number of log records that are completely processed and assigned to an LUOW. Example uses of this filter type would include, eliminating all the log records that were generated by a particular User ID or from a particular terminal because the user understands ahead of time that these records contain nothing pertaining to their current analysis job.

Figure 2:
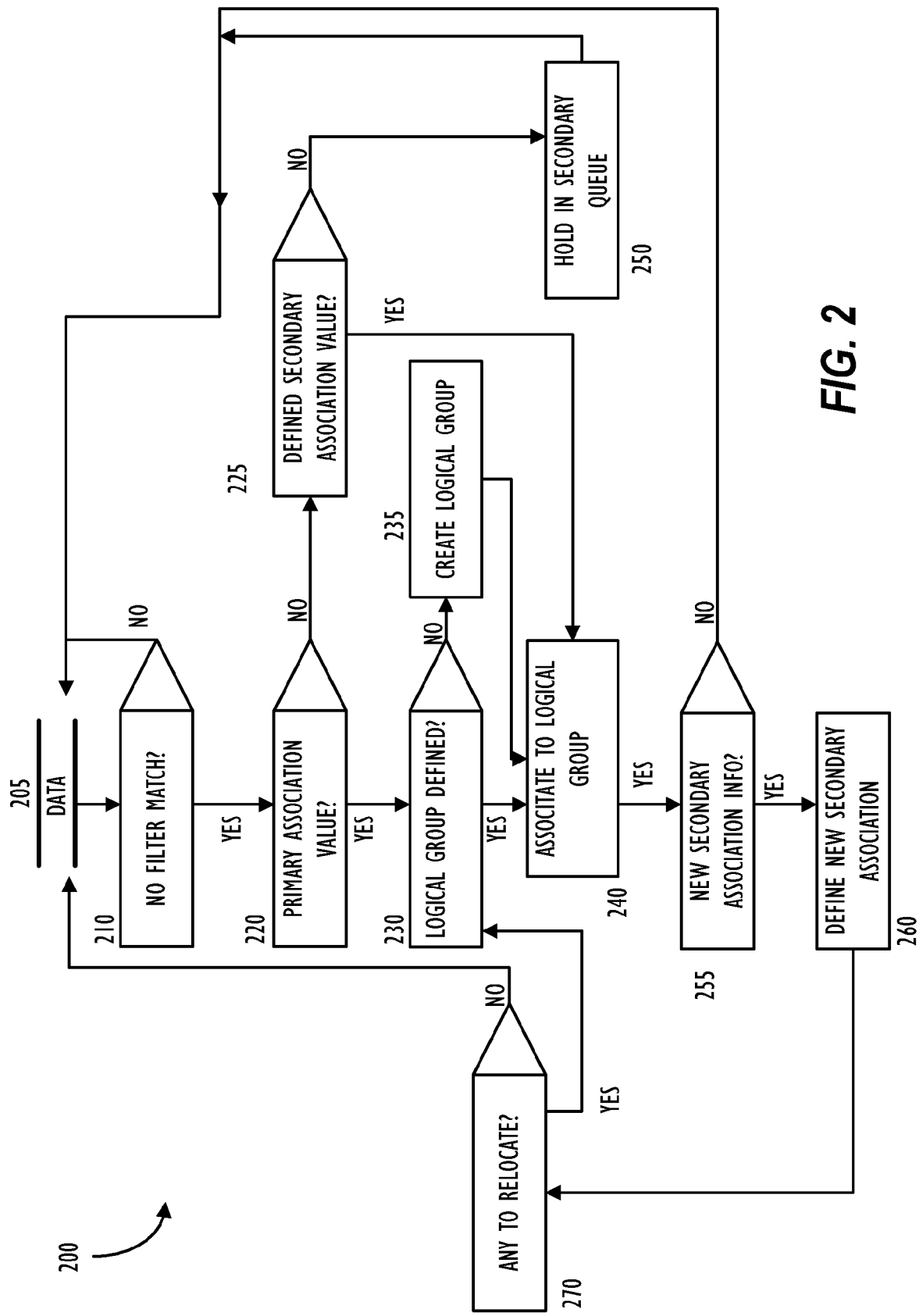
FIG. 2 shows, in flowchart form, an illustrative logical unit of work creation process.

Referring now to FIG. 2, log records are input to illustrative method 200 at block 205. For each log record from an input source 205, interrogate it to determine if it meets all the filter criteria supplied by the end user (block 210). If the log record does not meet this criteria (the "No" prong of block 210), it is discarded and another log record is retrieved (block 205) if available. For each log record passing this initial step (the "Yes" prong of block 210), the log record is further interrogated to determine if the log record, by itself, has a primary association value (block 220). When a primary association value is not available (the "NO" prong of block 220), another check is made to determine if the current log record can be associated with a previously identified logical group, for example, by its' secondary association value being the same as a previously identified secondary association value (block 225). When neither a primary association value nor a secondary association value are currently available (the "NO" prong of 225), the log record is held in a secondary queue (block 250) for later processing. The method now returns to process another log record (block 205) if available.

Returning to block 220, in the case when a primary association value is available (the "YES" prong of block 220), the log record is interrogated (block 230) to determine if the logical group to which it will be associated is already defined. If the logical group is defined (the "YES" prong of block 230), the association is made (block 240). When the logical group is not yet defined (the "NO" prong of block 230), a new logical group is defined (block 235) and the current record is associated therewith (block 240). Following any newly completed association (block 240), the log record is interrogated (block 255) to determine if new secondary association information has been found. Note that new associations can follow from multiple locations (e.g., block 225, block 235, block 230 or block 270) and in any of these cases a check for new secondary association information is preferably performed.

When no new secondary association information is found (the "NO" prong of block 255), the method returns to process another log record if available (block 205). When new secondary association information is found (the "YES" prong of block 255), the secondary holding queue is scanned to determine if any log records can now be associated to their logical group. For each log record that now has a matching secondary association value (block 270), that particular log record is relocated from its secondary holding queue and processed for proper association to its logical group (block 240). One of ordinary skill in the art will recognize that many loops or iterations are possible when new secondary association information is found. After all new secondary association information is exhausted (the "NO" prong of block 270), the method returns to retrieve another log record from an input source if available (block 205). After all log records have been processed, if any log records remain in the secondary queue (block 250), they can not be properly associated to any logical group and may be processed according to the rules appropriate for the environment being analyzed. For example, it might be appropriate to ignore the extra log records, present the log records to the user to determine if something was wrong with the input data or create an error condition and diagnostic report.

One of ordinary skill in the art will recognize that the particular order of these operations may be different and the number of intermediate queues (i.e. primary and secondary) may be different while still achieving the same results. This particular embodiment is only one of many possible embodiments and is in no way intended to limit the scope of the invention.

One of ordinary skill in the art, given the benefit of this disclosure, will also understand that processing log records from one or more systems will allow the system engineer to better understand a complex application or environment. Also, after completing the organization and correlation of the log records into LUOWs, the LUOWs so defined can be further processed, grouped and filtered to present the end user only the information pertinent to their current task or problem analysis.

For example, in an embodiment implemented in the IMS environment, transaction LUOWs typically have an origin (such as an IMS logical terminal, LTERM), a destination (such as another LTERM), and an originating user (e.g., user ID). As noted above, nontransaction LUOWs represent events that are not directly related to transactions. Partial LUOWs have no identifiable origin or destination (e.g., LTERMs), or originating user (e.g., user ID).

During a log analysis operation in accordance with one embodiment of the invention, as each LUOW is instantiated it is assigned a number, starting with LUOW-1, which is incremented as each LUOW is discovered. The LUOW numbers can be assigned dynamically based on each analysis and organizational run. In an IMS environment, there is a fixed key field called a Unit of Work (UOW-1), which is actually part of the data in some log records. The UOW-1 number can remain consistent across multiple log analysis runs to allow for better diagnostic capabilities when the diagnostic operator must refine the source inputs (e.g., log files 140, 145 and 150) between analysis runs. For a transaction type LUOW, the UOW-1 number assigned by IMS is unique across a SYSPLEX if all the IMS systems have unique IMSIDs. A SYSPLEX is a set of IMS systems joined together by means of a network or some other type of system coupling device into sharing groups (i.e. sharing databases, resources, or message queues). IMSIDs are the identifier number for each IMS system in a SYSPLEX. The user can then identify a specific LUOW in reports from different analysis runs by using this UOW-1 identifier. Additionally, if all the IMS systems have unique IMSIDs, the LUOW method allows for correlation of all records for a transaction, from beginning to end, even for message-switching transactions and transactions that execute across multiple systems in a SYSPLEX. Note that the LUOW method can be very helpful when examining log records from message-switching transactions because message-switching transactions appear to be conversational (i.e. internally, a new task is created to process each message switching input).

Figure 3:
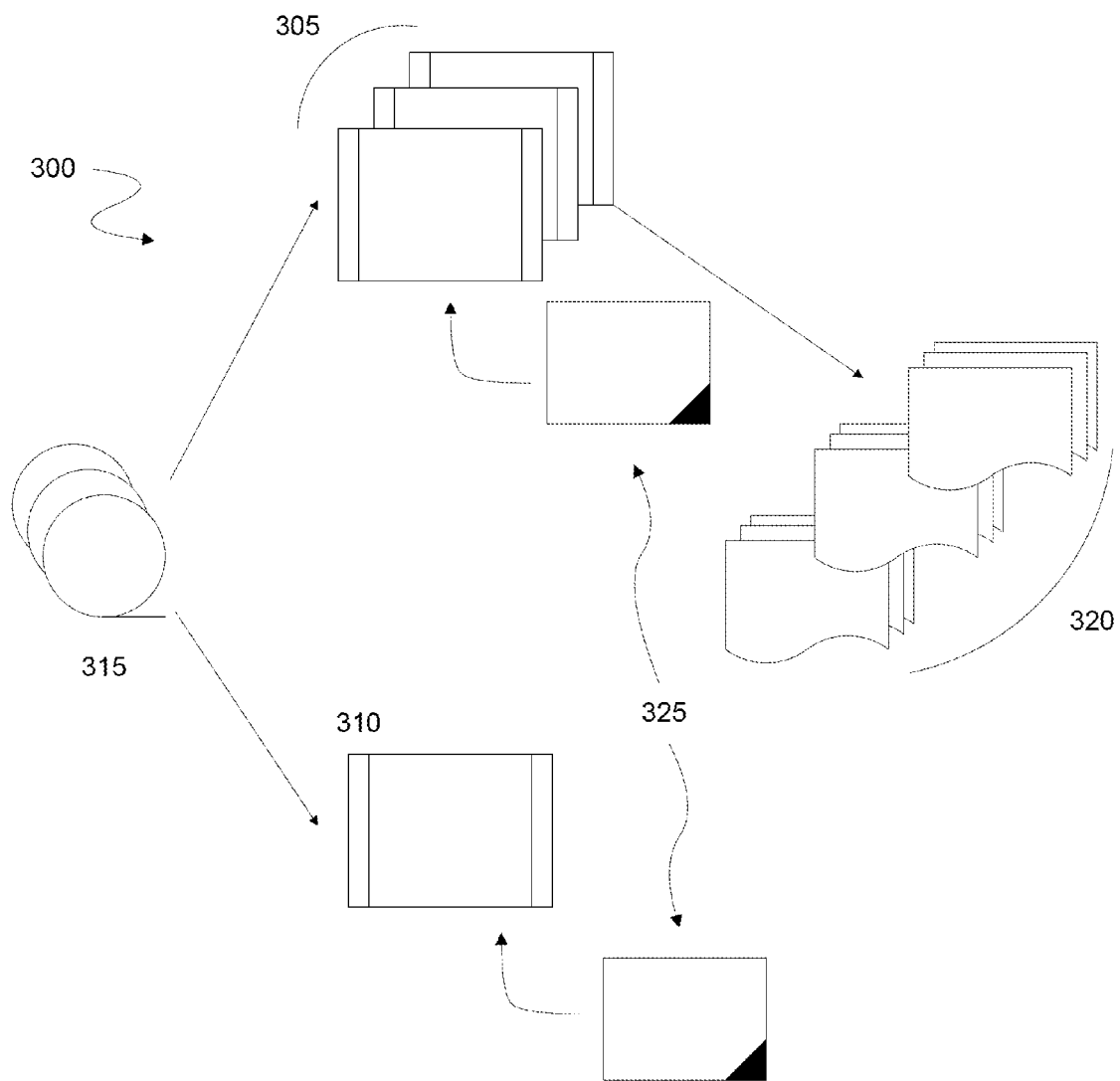
FIG. 3 illustrates the Logical Unit of Work (LUOW) concept.

Referring to FIG. 3, database log association method 300 in accordance with one embodiment of the invention uses primary queues 305 and secondary queue 310. Each set of queues are backed by control information 325. In order to create a LUOW, input log records 315 are optionally filtered, upon passing this filtering step it becomes a log record of interest. Once a log record of interest is identified it must be stored in either primary queue 305 or secondary queue 310 for later collation into a LUOW 320. Primary queue 305 stores log records of interest for which a primary association field value is available. Secondary queue 310 stores log records of interest for which a primary queue 305 is not yet ascertainable. A primary queue 305 is not ascertainable if the current log record of interest has a NULL value in the primary association field and no secondary association has yet been defined corresponding to any secondary association field of the log record. As more log records of interest are processed, additional secondary association information is defined and log records are relocated from secondary queue 310 to a primary queue 305. At the end of process, each primary queue 305 corresponds to a LUOW 320 and it is desirable to have an empty secondary queue 310. In the case where the secondary queue 310 is not empty, a diagnostic report is created for the user to determine if the correct input 315 was supplied.

To ease implementation, an optional work file may be defined if the input source(s) contains a large number of records or is extremely large. Recall, records of interest are those records obtained from (possibly) multiple input sources after the log records have passed one or more optional predefined filtering steps. The work file may be a standard disk cache so that the analysis process does not have to keep all processing information in memory throughout its entire run.

By way of example, in an embodiment implemented for use with an IMS system, process 200 uses primary queues 305 to categorize log records 315 in which the particular field that is referenced is in the target log record. Log records that contain a common UOW-1 value are added directly to a primary queue. Thus, each primary queue 305 retains those log records that are associated with a single LUOW. Some log records (for example, database update records) have a NULL UOW-1 value and thus a secondary association is required to associate these log records with the proper primary queue 305 and, finally, its correct LUOW. As discussed above, the LUOW process 200 initially organizes the log records that have no UOW-1 data value into a secondary queue 310. The process 200 may eventually encounter a log record that contains both UOW-1 data and the recovery token (a unique number generated by IMS to track commits made during a transaction). Therefore, this log record contains both primary association information and newly acquired secondary association information. These records cause the LUOW creation process to relocate the secondary queue records which have the same secondary association value (in this particular case the recovery token value) to the proper primary queue entry. As illustrated in FIG. 3, each queue may be backed by one or more control blocks 325 that represent the LUOW and each log record that the LUOW contains. If log records remain in secondary queue 310 after all obtained records have been processed, a partial LUOW may be created. At the conclusion of the LUOW creation process, the primary queues can be scanned and information about all LUOWs can be reported. which have the same secondary association value (in this particular case the recovery token value) to the proper primary queue entry. As illustrated in FIG. 2, each queue may be backed by one or more control blocks 325 that represent the LUOW and each log record that the LUOW contains. If log records remain in secondary queue 310 after all obtained records have been processed, a partial LUOW may be created. At the conclusion of the LUOW creation process, the primary queues can be scanned and information about all LUOWs can be reported.

In the current example, a secondary association was defined when a log record had both its UOW-1 field and recovery token fields populated with non-NULL values. Other secondary associations may be made in an IMS environment, for example, using the LTERM and/or user ID field values. Sometimes a combination of secondary field values may be required to guarantee a unique value is used for secondary association purposes. In an IMS environment, for example, record numbers 11, 13, 12, 01 and 03 are LTERM/UID type records with 01 and 03 containing secondary association information to UOW-1 type records. Record numbers 31, 08, 5X, 07, 0A are RECOVERY TOKEN type records with 31 containing secondary association information to UOW-1 type records. Record numbers 01, 03, 31, 35, 3X are UOW-1 type records with record numbers 01 and 03 containing secondary association information to LTERM/UID records and record number 31 containing secondary association information to RECOVERY TOKEN type records.

After all LUOWs have been created, a secondary set of filters may be applied to determine which of the LUOWs is of interest to the user. Applying a filter to the LUOWs is similar to the filter being applied to input sources (i.e. it focuses the data analysis based upon user supplied criteria). Analysis of log data after LUOWs are created is now simplified for the end user because the log records have been obtained and correlated in a logical organization to aid in problem analysis or other types of information analysis. One method to aid in problem analysis is to interleave the log records from two (2) or more LUOWs with each other to provide valuable information about possible interaction in the system from the activities associated with each particular LUOW.

In another embodiment, the analysis information contained in LUOWs can be saved in a file and optionally associated with an index file. The index file allows for optimized future retrieval and use of the saved file along with possibly one or more other log record sources. This procedure would allow analysis of the log records already organized and newly obtained log records in an iterative fashion.

In the illustrative embodiment described here, the user is enabled to navigate data which has been organized and correlated, according to the method of this disclosure, in a logical manner through the interface capabilities provided by the Interactive System Productivity Facility (ISPF), which is part of the Multiple Virtual Systems (MVS) environment, both provided by IBM. In other environments or implementations, a graphical user interface (GUI) could be implemented by one of ordinary skill in the art to provide similar or expanded, graphical review of the identified LUOWs.

Another benefit of the described log file analysis method is that users (e.g., system administrators or engineers) are able to "drill down" through the LUOWs to review the specific activities that comprise that LUOW or transaction. This can be particularly useful in the diagnosis of trouble areas or comprehensive analysis of system interdependencies. This, in turn, can aid in analyzing transaction failures, transaction delays, system diagnosis, application diagnoses, performance tuning, system auditing and production planning.

Various changes in the details of the illustrated operational methods are possible without departing from the scope of the following claims. For instance, illustrative log record processing method 200 may perform the identified steps in an order different form that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 1, 2 and 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs" or field programmable gate array ("FPGAs". Storage devices suitable for tangibly embodying program instructions include, but are not limited to: magnetic disks (fixed, floppy, and removable) and tape; optical media such as CD-ROMs and digital video disks ("DVDs"; and semiconductor memory devices such as Electrically Programmable Read-Only Memory ("EPROM", Electrically Erasable Programmable Read-Only Memory ("EEPROM", Programmable Gate Arrays and flash devices.

The invention claimed is:

1. A method for operating a computer system performing a log association method, the method comprising:

the computer system obtaining, in one pass, a plurality of log records from at least one input source of unprocessed log records, such that each record is read once from the input source during the one pass, each log record having a plurality of fields, each field having a value;

the computer system associating each log record, as obtained in the one pass, having a first common value in a first one or more fields with a first logical group, at least one log record in the first logical group having a second value in a second one or more fields;

the computer system associating each log record having the second common value in the second one or more fields and not having the first common value in the first one or more fields with the first logical group;

the computer system retaining, in a secondary queue for organizing log records not assigned to a logical group when obtained in the one pass, at least one log record from the plurality of log records when the value of the first one or more fields of the at least one log record is different than the first common value and the value of the second one or more fields of the at least one log record is different than the second common value;

the computer system determining that a particular log record associated to the first logical group has a third common value in the second one or more fields;

responsive to the determining, the computer system retrieving previously retained log records from the secondary queue;

the computer system associating each log record retrieved from the secondary queue with the first logical group if the value of the second one or more fields of the retrieved log record equals the third common value; and using the first logical group to analyze operations of one or more systems associated with the plurality of log records.

2. The method of claim 1, further comprising:

the computer system performing the acts of associating for a second logical group, the second logical group having a fourth common value associated with it, each log record associated with the second logical group having a value in the first one or more fields of the log record equal to the fourth common value; and using the second logical group to analyze operations of one or more systems associated with the plurality of log records.

3. The method of claim 2, further comprising associating each log record in the plurality of log records not having the first or fourth common values in the first one or more fields and having a fifth common value in the second one or more fields with the second logical group, wherein at least one log record in the second logical group has the fifth common value in the second one or more fields.

4. The method of claim 3, further comprising:
obtaining each of the at least one previously retained log records from the secondary queue; and
associating each of the at least one previously retained log records having the fifth common value in the second one or more fields with the second logical group.

5. The method of claim 2, further comprising, interleaving a set of more than one logical group to present an interrelated system effect of said plurality of logical groups.

6. The method of claim 2, wherein the logical groups are further filtered to determine a set of logical groups of interest.

7. The method of claim 1, wherein the first one or more fields are wholly different from the second one or more fields.

8. The method of claim 1, wherein the first one or more fields and the second one or more fields have at least one field in common.

9. The method of claim 1, wherein the plurality of log records are associated with log records stored in a flat file.

10. The method of claim 1, wherein the act of obtaining comprises:
defining a skip value and a limit value;
applying the skip value to discard zero or more lines of said input source; and
applying the limit value to discard zero or more lines of said input source.

11. The method of claim 1, wherein the act of obtaining further comprises, confining said input sources to a particular time interval.

12. The method of claim 1, wherein said input sources comprise at least one file containing previously defined logical groups.

13. The method of claim 1, wherein the plurality of log records are associated with one or more hierarchical databases.

14. The method of claim 13, wherein the first one or more fields comprise at least a UOW-1 field.

15. The method of claim 13, wherein the second one or more fields comprise at least a recovery token field.

16. The method of claim 1, wherein the plurality of log records are associated with one or more relational databases.

17. The method of claim 1, wherein the plurality of log records are associated with one or more object-oriented databases.

18. The method of claim 1, wherein the first logical group comprises a logical unit of work.

19. A method for operating a computer system to group database log records into logical groups for database operations management, the method comprising:
the computer system obtaining, in one pass, a plurality of log records from at least one source of unprocessed log records, such that each record is read once from the source during the one pass, each log record having a plurality of fields, each field having a value;
the computer system assigning a first log record from the plurality of log records, as the first log record is obtained in the one pass, to a first logical group if the first log record has a first value in a first one or more fields, at least one log record in the first logical group having a second value in a second one or more fields;
the computer system assigning a second log record from the plurality of log records to the first logical group if the second log record has the second value in the second one or more fields and does not have the first value in the first one or more fields;
the computer system retaining a third log record from the plurality of log records in a secondary queue for organizing log records not assigned to a logical group when obtained in the one pass if the first one or more fields in the third log record does not match the first value and the second one or more fields in the third log record does not match the second value;
the computer system determining that a fourth log record from the plurality of log records is associated with the first logical group and has a third common value in the second one or more fields;
responsive to the determining, the computer system retrieving previously retained log records from the secondary queue; and
the computer system associating each log record retrieved from the secondary queue with the first logical group if the value of the second one or more fields of the retrieved log record equals the third common value.

20. The method of claim 19, further comprising:
the computer system assigning a fifth log record to a second logical group, the fifth log record having a fourth value in the first one or more fields;
the computer system determining that the fifth log record has a fifth value in the second one or more fields;
responsive to the determining, the computer system retrieving the third log record from the secondary queue; and
the computer system associating the third log record with the second logical group responsive to determining that the third log record has the fifth value in the second one or more fields.

21. The method of claim 19, wherein the second field value comprises a combination of values from a second plurality of fields.

22. The method of claim 19, wherein the first field value comprises a combination of values from a first plurality of fields.

23. A program storage device, readable by a programmable control device, comprising instructions tangibly embodied thereon for causing the programmable control device to:
obtain, in one pass, a plurality of log records from at least one input source of unprocessed log records, such that each log record is read once form the input source during the pass, each log record having a plurality of fields, each field having a value;
associate, each log record, as obtained in the one pass, having a first common value in a first one or more fields with a first logical group, at least one log record in the first logical group having a second value in a second one or more fields;
associate each log record having the second common value in the second one or more fields and not having the first common value in the first one or more fields with the first logical group;
retain, in a secondary queue for organizing log records not assigned to a logical group when obtained in the one pass, a particular log record from the plurality of log records when the value of the first one or more fields of the particular log record is different than the first common value and the value of the second one or more fields of the particular log record is different than the second common value;

determine that another log record from the plurality of log records is associated with the first logical group by having the first common value in the first one or more fields, the another log record having a third common value in the second one or more fields;

responsive to the determining, obtain the particular log record from the secondary queue;

associate the particular log record obtained from the secondary queue with the first logical group if the value of the second one or more fields of the particular log record equals the third common value; and provide the first logical group to an end user for analysis of operations of one or more systems associated with the plurality of log records.

24. The program storage device of claim 23, wherein the instructions further cause the programmable control device to:

assign a second particular log record, as obtained in the one pass, to a second logical group, the second particular log record having a fourth value in the first one or more fields;

determine that the second particular log record has a fifth common value in the second one or more fields;

responsive to the determining, retrieve the particular log record from the secondary queue; and associate the particular log record with the second logical group responsive to determining that the particular log record has the fifth common value in the second one or more fields.

* * * * *